(12) United States Patent
Beckman

(10) Patent No.: US 6,769,178 B1
(45) Date of Patent: Aug. 3, 2004

(54) METHOD OF MANUFACTURING A VEHICLE FRAME ASSEMBLY INCLUDING HYDROFORMED SIDE RAILS HAVING INTEGRALLY FORMED MOUNTING AREAS

(75) Inventor: John A. Beckman, Wernersville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/025,531

(22) Filed: Feb. 18, 1998

(51) Int. Cl.⁷ .............................................. B21D 53/88
(52) U.S. Cl. .................................... 29/897.2; 29/421.1
(58) Field of Search ........................... 296/203.01, 204, 296/205, 209; 29/897.2, 421.1; 72/61, 55, 58, 62; 280/781, 785, 796, 797, 798; 180/311; 27/523, 428, 897

(56) References Cited

U.S. PATENT DOCUMENTS

| | | | | |
|---|---|---|---|---|
| 2,784,983 A | * | 3/1957 | Dean .......................... 29/897.2 |
| 4,386,792 A | * | 6/1983 | Moore et al. ................ 280/781 |
| 4,928,509 A | | 5/1990 | Nakamura |
| 5,070,717 A | | 12/1991 | Boyd et al. |
| 5,170,557 A | * | 12/1992 | Rigsby ....................... 29/455.1 |
| 5,322,208 A | * | 6/1994 | Hinrichs et al. ............ 29/897.2 |
| 5,332,281 A | * | 7/1994 | Janotik et al. .............. 296/209 |
| 5,339,667 A | * | 8/1994 | Shah et al. ................. 29/421.1 |
| 5,431,326 A | | 7/1995 | Ni et al. |
| 5,481,892 A | | 1/1996 | Roper et al. |
| 5,482,323 A | * | 1/1996 | Hicks ......................... 280/785 |
| 5,499,520 A | | 3/1996 | Roper |
| 5,549,352 A | * | 8/1996 | Janotik et al. .............. 296/209 |
| 5,557,961 A | * | 9/1996 | Ni et al. ..................... 29/421.1 |
| 5,561,902 A | * | 10/1996 | Jacobs et al. .............. 29/897.2 |
| 5,632,508 A | * | 5/1997 | Jacobs et al. .............. 280/781 |
| 5,641,180 A | * | 6/1997 | Kamei et al. .............. 280/781 |
| 5,666,840 A | * | 9/1997 | Shah et al. ................... 72/55 |
| 5,700,033 A | * | 12/1997 | Beckman ..................... 280/795 |
| 5,720,092 A | * | 2/1998 | Ni et al. ..................... 29/421.1 |
| 5,813,266 A | * | 9/1998 | Ash ............................ 29/421.1 |
| 5,816,089 A | * | 10/1998 | Marando ....................... 72/55 |
| 5,862,877 A | * | 1/1999 | Horton et al. .............. 280/781 |
| 5,882,039 A | * | 3/1999 | Beckman et al. ........... 280/781 |

* cited by examiner

Primary Examiner—Charles T. Jordan
Assistant Examiner—T. Nguyen
(74) Attorney, Agent, or Firm—MacMillan, Sobanski & Todd, LLC

(57) ABSTRACT

A method includes hydroforming a pair of side rails from a single closed structural member so as to having a plurality of mounting areas integrally formed thereon. The frame assembly includes a pair of longitudinally extending side rails having a plurality of transverse cross member extending therebetween. Each of the side rails is formed from a single integral closed structural member that extends the entire length of the frame assembly. The cross members extend generally perpendicular to the side rails and may be formed having any conventional structure. Each of the side rails is manufactured having a plurality of integrally formed mounting structures to facilitate the connection of the various components (not shown) of the vehicle directly to the frame assembly without the use of any brackets and mounts. The side rails are hydroformed to desired shapes and have respective pluralities of apertures and protrusions formed therein. The side rails are formed into desired shapes such that the apertures and protrusions can be located in exactly the same positions relative to the frame assembly as the corresponding apertures and protrusions provided on the various brackets and mounts of the prior art frame assembly. As a result, the other components of the vehicle can be connected directly to the side rails to form the frame assembly. This direct side rail mounting structure eliminates the need for the various brackets and mounts provided in the prior art frame assembly and, as a result, greatly reduces the time and expense involved in manufacturing the ladder frame assembly of this invention.

9 Claims, 6 Drawing Sheets

METHOD OF MANUFACTURING A VEHICLE FRAME ASSEMBLY INCLUDING HYDROFORMED SIDE RAILS HAVING INTEGRALLY FORMED MOUNTING AREAS

BACKGROUND OF THE INVENTION

This invention relates in general to frame assemblies for vehicles. More specifically, this invention relates to an improved method for manufacturing a vehicle frame assembly including a pair of side rails, each of which is formed from a single closed structural member that formed by hydroforming so as to having a plurality of mounting areas integrally formed thereon.

Many land vehicles in common use, such as automobiles, vans, and trucks, include a frame assembly that is supported upon a plurality of ground-engaging wheels by a resilient suspension system. The structures of known frame assemblies can be divided into two general categories, namely, separate and unitized. In a typical separate frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modem vehicles, such as automobiles and minivans.

One well known example of a separate type of vehicular frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural members that are secured together. For example, in vehicles having a relatively short overall length, it is known to form each of the side rails from a single integral structural member that extends the entire length of the vehicle frame assembly. In vehicles having a relatively long overall length, it is known to form each of the side rails from two or more individual structural members that are secured together, such as by welding, riveting, or bolting to provide a unitary structural member that extends the entire length of the vehicle frame assembly.

Traditionally, the side rails of known vehicle frame assemblies have been formed exclusively from open structural members, i.e., structural members that have a non-continuous cross sectional shape (U-shaped or C-shaped members, for example). Thus, it is known to use a single integral open structural member to form a side rail that extends the entire length of the vehicle frame assembly, as described above. Additionally, it is known to secure a plurality of such open structural members together to form the individual sections of a unitary side rail for a vehicle frame assembly, as also described above. However, the use of open structural members to form the side rails for vehicle frame assemblies has been found to be somewhat inefficient for several reasons from a manufacturing standpoint. First, it is relatively time consuming and expensive to bend multiple portions of the side rails to conform to a desired final shape, as is commonly necessary. Second, after such bending has been performed, a relatively large number of brackets or other mounting devices must usually be secured to each of the side rails to facilitate the attachment of the various components of the vehicle to the frame assembly. Third, in those instances where the side rails are formed from a plurality of individual sections, it has been found difficult to maintain dimensional stability throughout the length of the side rail when the individual side rail sections are secured together. Thus, known vehicle frame assemblies having side rails formed from one or mote open structural members have been found to be somewhat inefficient to manufacture.

More recently, it has been proposed to form the side rails in vehicle frame assemblies from closed structural members, i.e., structural members that have a continuous cross sectional shape (tubular or box-shaped members, for example). Thus, it is known to use a single integral closed structural member to form a side rail that extends the entire length of the vehicle frame assembly, as described above. Additionally, it is known to secure one a plurality of such closed structural members together to form the individual sections of a unitary side rail for a vehicle frame assembly, as also described above. Furthermore, it is known to secure a combination open and closed structural members together to form the individual sections of a unitary side rail for a vehicle frame assembly.

In vehicle frame assemblies formed from closed structural members, it is known that hydroforming may be used to deform the closed structural member into a desired shape. Hydroforming is a well known process that uses pressurized fluid to deform a closed structural member into a desired shape. To accomplish this, the structural member is initially disposed between two die sections of a hydroforming apparatus which, when closed together, define a die cavity having a desired final shape. Thereafter, the structural member is filled with a pressurized fluid, typically a relatively incompressible liquid such as water. The pressure of the fluid is increased to a magnitude where the structural member is expanded outwardly into conformance with the die cavity. As a result, the structural member is deformed into the desired final shape.

Hydroforming has been found to be a desirable process for deforming the closed structural member because the individual side rail section can be quickly and easily deformed to have a desired cross sectional shape. For example, the individual side rail section may be formed having a generally rectangular or box-shaped cross section. This cross sectional shape is advantageous not only because it provides strength and rigidity to the individual side rail section, but also because it provides vertically and horizontally oriented side surfaces which facilitate the attachment of various brackets and mounts used to support other components of the vehicle on the vehicle frame structure. However, even in known hydroformed side rail structures, the attachment of these various brackets and mounts is a relatively expensive and time consuming process. Thus, it would be desirable to provide an improved method for manufacturing a side rail for use in a vehicle frame assembly that eliminate the need for attaching these various brackets and mounts.

SUMMARY OF THE INVENTION

This invention relates to an improved method for manufacturing a vehicle frame assembly including a pair of side rails, each of which is formed from a single closed structural member that is formed by hydroforming so as to having a plurality of mounting areas integrally formed thereon. The frame assembly includes a pair of longitudinally extending side rails having a plurality of transverse cross members extending therebetween. Each of the side rails is formed from a single integral closed structural member that extends the entire length of the frame assembly. The cross members extend generally perpendicular to the side rails and may be formed having any conventional structure. Each of the side rails is manufactured having a plurality of integrally formed mounting structures to facilitate the connection of the various components (not shown) of the vehicle directly to the frame assembly without the use of any brackets and mounts. The side rails are hydroformed to desired shapes and have respective pluralities of apertures and protrusions formed therein. The side rails are formed into desired shapes such that the apertures and protrusions can be located in exactly the same positions relative to the frame assembly as the corresponding apertures and protrusions provided on the various brackets and mounts of the prior art frame assembly. As a result, the other components of the vehicle can be connected directly to the side rails to form the frame assembly. This direct side rail mounting structure eliminates the need for the various brackets and mounts provided in the prior art frame assembly and, as a result, greatly reduces the time and expense involved in manufacturing the ladder frame assembly of this invention.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
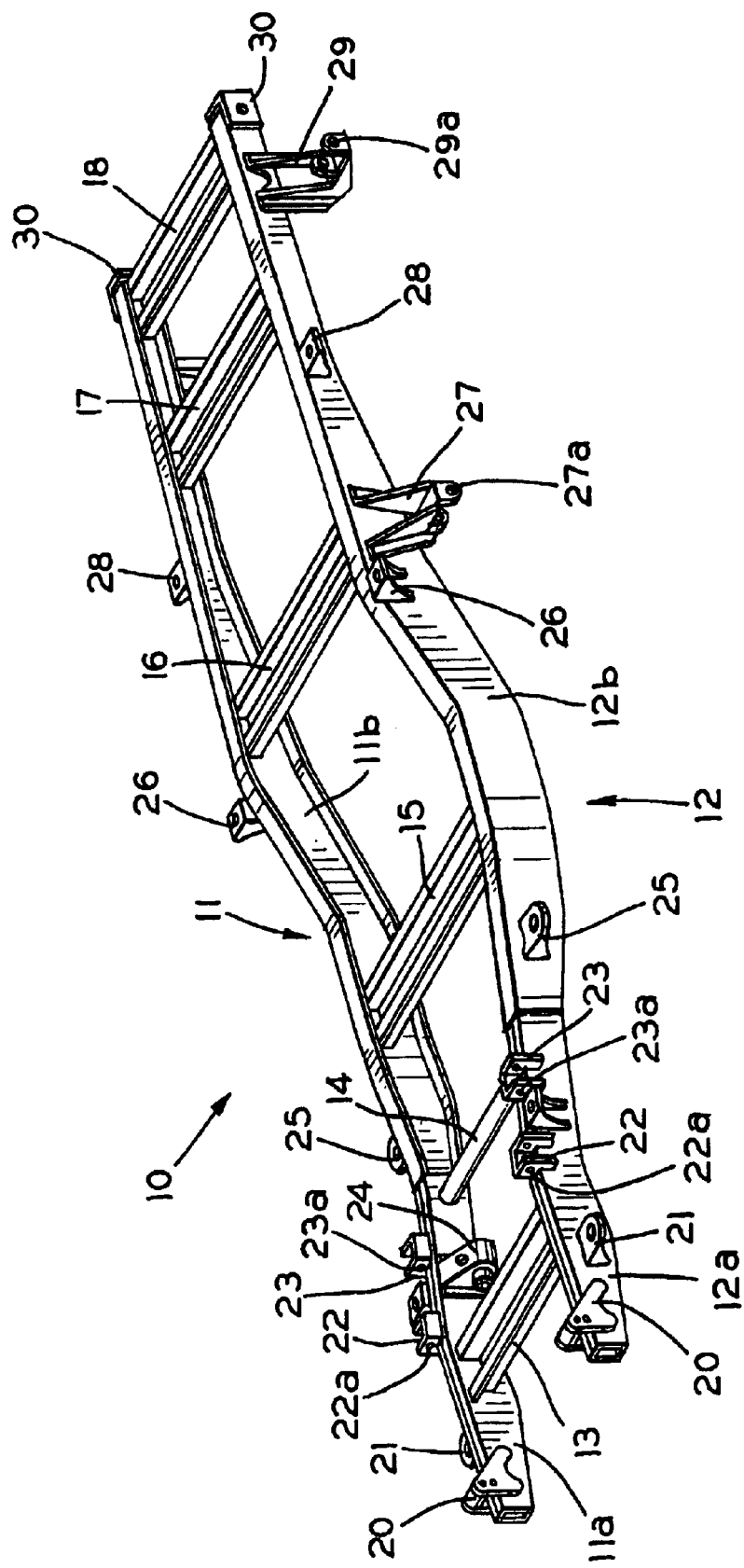
FIG. 1 is a perspective view of a typical prior art ladder frame assembly for a vehicle.
Figure 2:
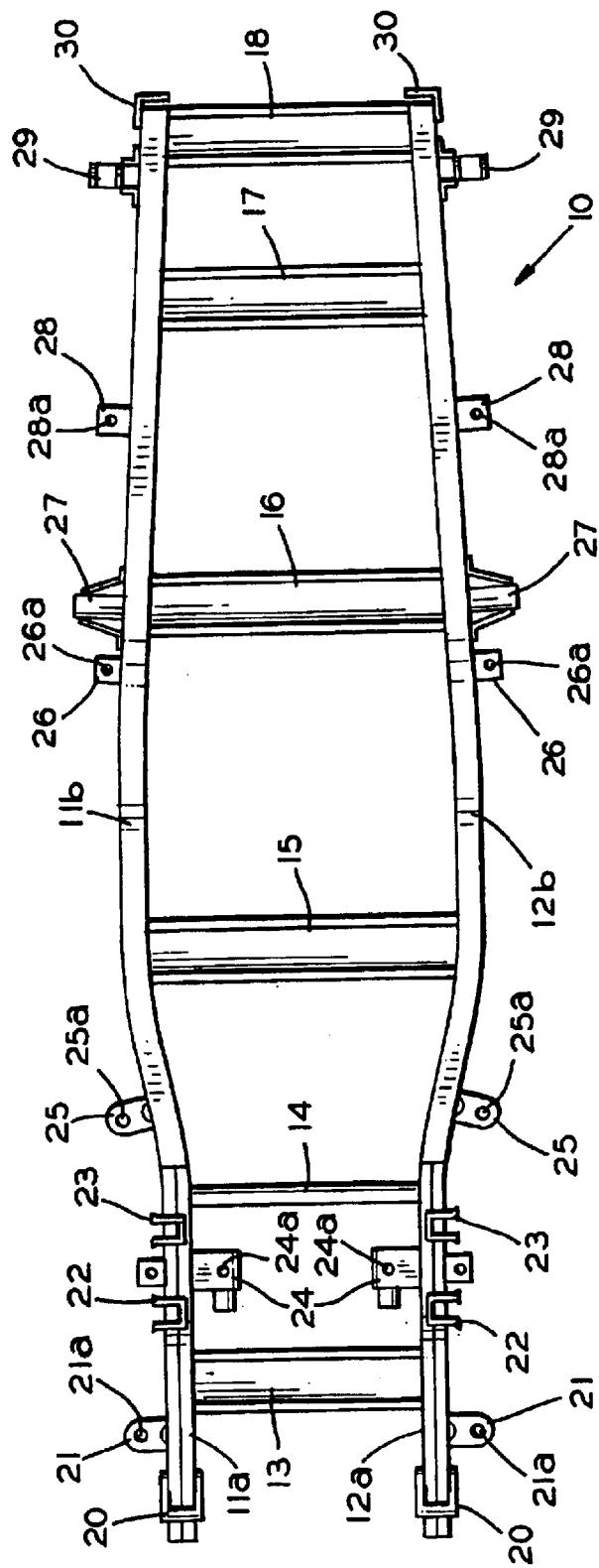
FIG. 2 is a top plan view of the prior art ladder frame assembly illustrated in FIG. 1.
Figure 3:
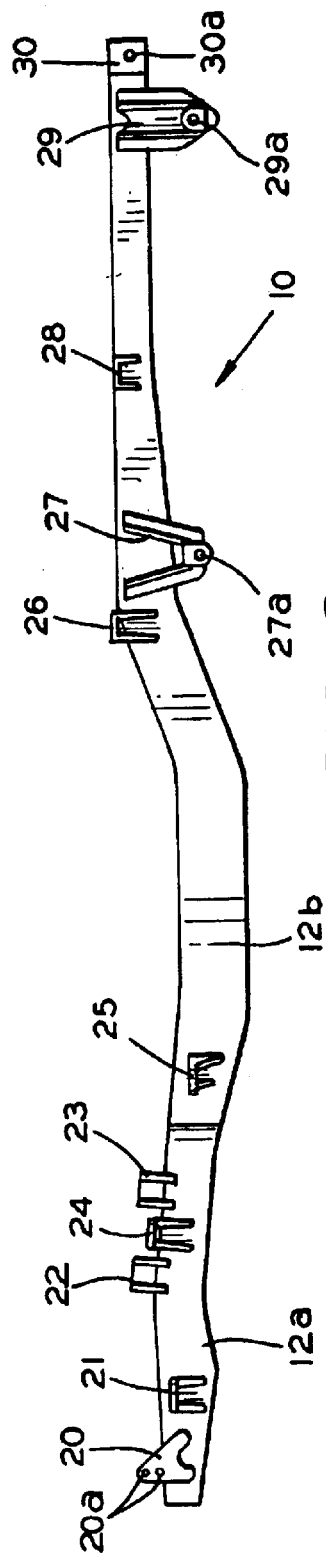
FIG. 3 is a side elevational view of the prior art ladder frame assembly illustrated in FIGS. 1 and 2.

Referring now to the drawings, there is illustrated in FIGS. 1, 2, and 3 a prior art ladder frame assembly, indicated generally at 10, for a vehicle. The prior art ladder frame assembly 10 includes a pair of longitudinally extending side rails, indicated generally at 11 and 12, having a plurality of transverse cross members 13, 14, 15, 16, 17, and 18 extending therebetween. The side rails 11 and 12 extend longitudinally throughout the entire length of the assembly 10 and are generally parallel to one another. The cross members 13 through 18 extend generally perpendicular to the side rails 11 and 12 and may be formed having any conventional structure. The cross members 13 through 18 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 through 18 provide lateral and torsional rigidity to the ladder frame assembly 10.

Each of the illustrated side rails 11 and 12 is formed from two sections, namely, a front side rail section 11a and 12a and a rear side rail section 11b and 12b. The side rail sections 11a and 12a are respectively secured to the rear side rail sections 11b and 12b by any conventional means, such as by welding, riveting, or bolting, to form the unitary side rails 11 and 12. The front side sections 11a and 12a illustrated in FIGS. 1, 2, and 3 are closed structural members, while the rear side rail sections 11b and 12b are open structural members. However, as discussed above, it is known to form the front side sections 11a and 12a and the rear side rail sections 11b and 12b from either open or closed structural members, and further to form the side rails from single integral open or closed structural members.

A plurality of individual brackets and mounts are secured to each of the side rails 11 and 12 to facilitate the attachment of various components (not shown) to the prior art ladder frame assembly 10. The specific structures of these various brackets and mounts, as well as the quantities thereof, will vary from vehicle to vehicle. Accordingly, the illustrated brackets and mounts are intended to be representative of any known bracket and mount structures that are adapted to connect any number of conventional components to the prior art ladder frame assembly 10. In the illustrated prior art ladder frame assembly 10, each of the side rails 11 and 12 has a front bumper bracket 20 secured thereto. The front bumper brackets 20 have respective pairs of apertures 20a formed therethrough to facilitate the connection of a conventional front bumper assembly (not shown) to the prior art ladder frame assembly 10. Each of the side rails 11 and 12 also has a front end sheet metal bracket 21 secured thereto. The front end sheet metal brackets 21 have respective apertures 21a formed therethrough to facilitate the connection of a portion of the body (not shown) of the vehicle to the prior art ladder frame assembly 10. A pair of upper control arm brackets 22 and 23 are secured to each of the side rails 11 and 12. The upper control arm brackets 22 and 23 have respective aligned apertures 22a and 23a formed therethrough to facilitate the connection of respective upper control arms (not shown) to the prior art ladder frame assembly 10.

Each of the side rails 11 and 12 further has an engine mount 24 secured thereto. The engine mounts 24 are shaped to support an engine (not shown) of the vehicle thereon, and further have apertures 24a formed therethrough to facilitate the connection of the engine to the prior art ladder frame assembly 10. Similarly, a front cab mount 25 and a front box mount 26 are secured to each of the side rails 11 and 12. The mounts 25 and 26 have respective apertures 25a and 26a formed therethrough to facilitate the connection of portions of the cab and box (not shown) of the vehicle to the prior art ladder frame assembly 10. A rear spring front bracket 27 is secured to each of the side rails 11 and 12. Each of the rear spring front brackets 27 has a pair of aligned apertures 27a formed therethrough to facilitate the attachment of a front end of the rear leaf springs (not shown) to the prior art ladder frame assembly 10. Similarly, an intermediate box bracket 28 having an aperture 28a formed therethrough is secured to each of the side rails 11 and 12 to facilitate the connection of a portion of the box of the vehicle to the prior art ladder frame assembly 10. A rear spring rear bracket 29 is secured to each of the side rails 11 and 12. Each of the rear spring rear brackets 29 has a pair of aligned apertures 29a formed therethrough to facilitate the attachment of a rear end of the rear leaf springs (not shown) to the prior art ladder frame assembly 10. Lastly, each of the side rails 11 and 12 has a rear bumper bracket 30 secured thereto. The rear bumper brackets 30 have respective apertures 30a formed therethrough to facilitate the connection of a conventional rear bumper assembly (not shown) to the prior art ladder frame assembly 10.

Figure 4:
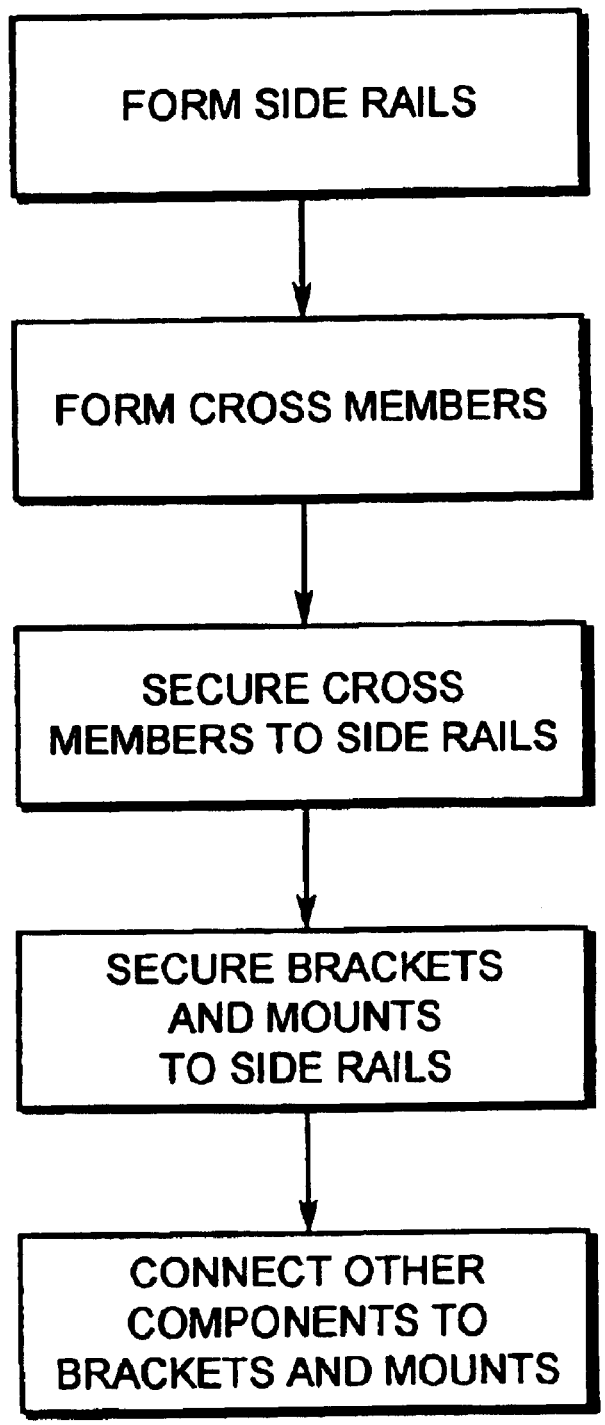
FIG. 4 is a flow chart that illustrates the method for manufacturing the prior art ladder frame assembly illustrated in FIGS. 1, 2, and 3.

FIG. 4 is a flow chart that illustrates the method for manufacturing the prior art ladder frame assembly 10 illustrated in FIGS. 1, 2, and 3. Initially, the side rails 11 and 12 and the cross members 13 through 18 are formed in the manner described above. Then, the cross members 13 through 18 are secured to the side rails 11 and 12 in any conventional manner. Next, the various brackets and mounts 20 through 30 are secured to the side rails 11 and 12 in a conventional manner, such as by welding. Lastly, the other components of the vehicle are connected to the various brackets and mounts 20 through 30 to form the prior art ladder frame assembly 10.

It will be appreciated that during the manufacture of the prior art ladder frame assembly 10, each of the brackets and mounts 20 through 30 must be precisely positioned and secured on the side rails 11 and 12 at predetermined mounting locations in order to properly connect each of the various components thereon. Any variance from these predetermined mounting locations can result in an improperly manufactured vehicle. Thus, it is very important that each of the brackets and mounts 20 through 30 be secured at precise locations on each of the side rails 11 and 12. This has been found to be relatively difficult and time consuming to accomplish, particularly when a wide variety of such brackets and mounts 20 through 30 must be secured to each of the side rails 11 and 12 of the prior art ladder frame assembly 10.

Figure 5:
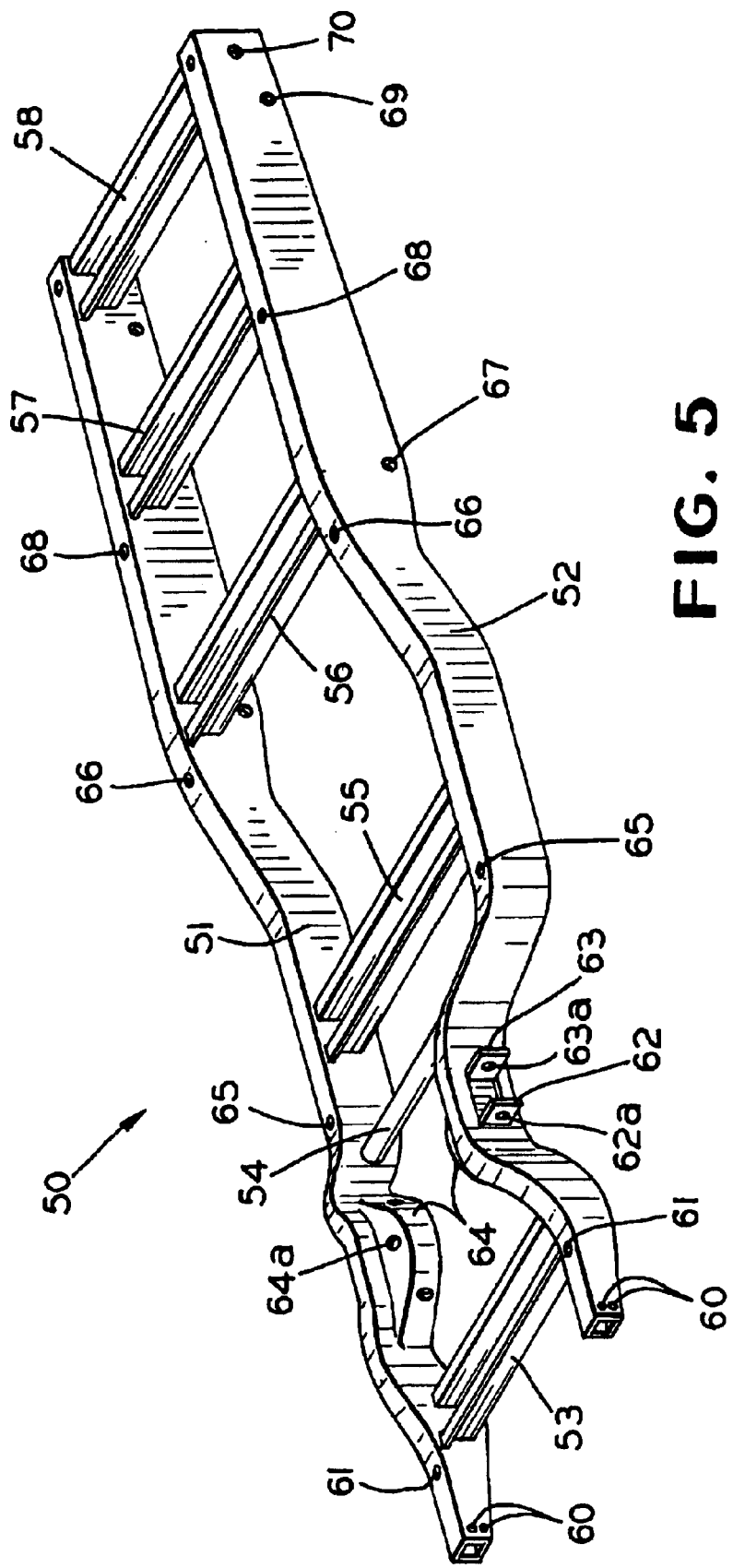
FIG. 5 is a perspective view of a ladder frame assembly for a vehicle in accordance with this invention.
Figure 6:
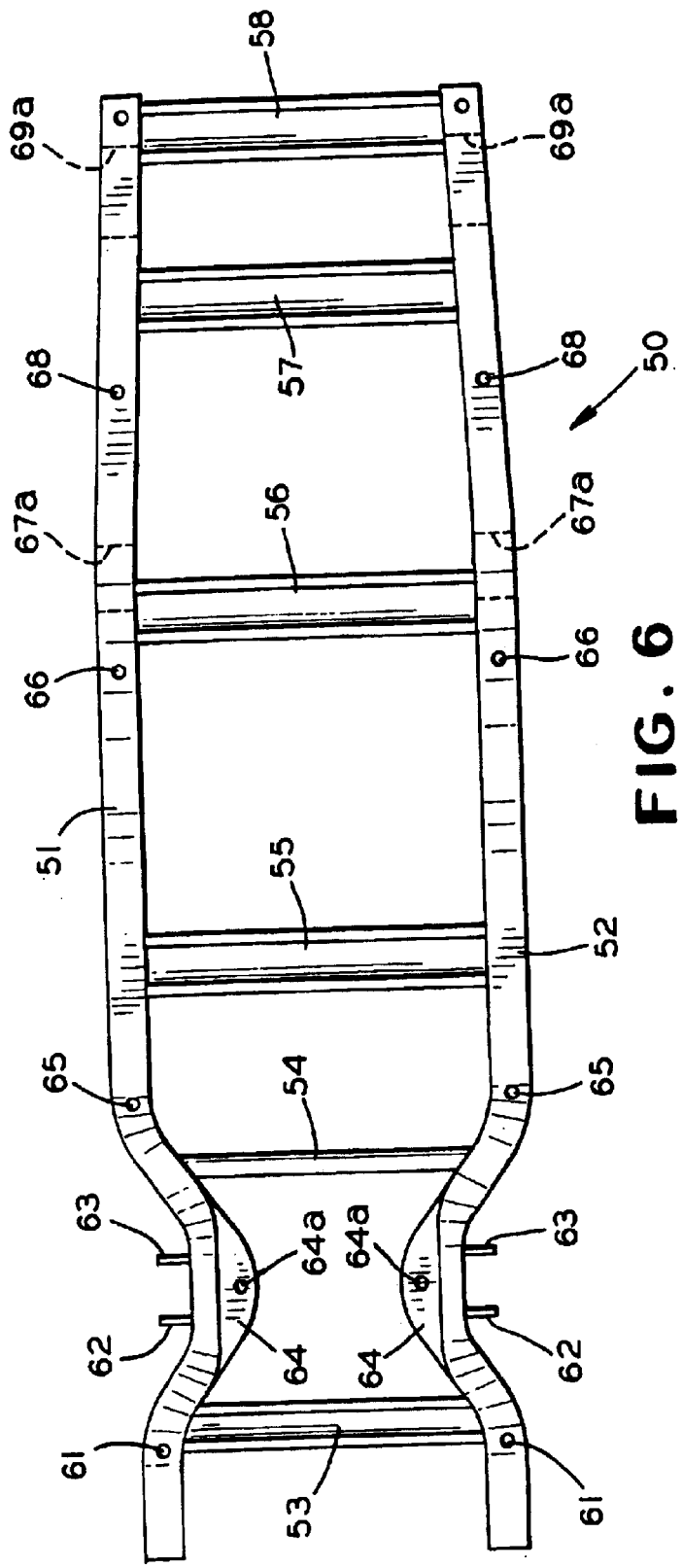
FIG. 6 is a top plan view of the ladder frame assembly of this invention illustrated in FIG. 5.
Figure 7:
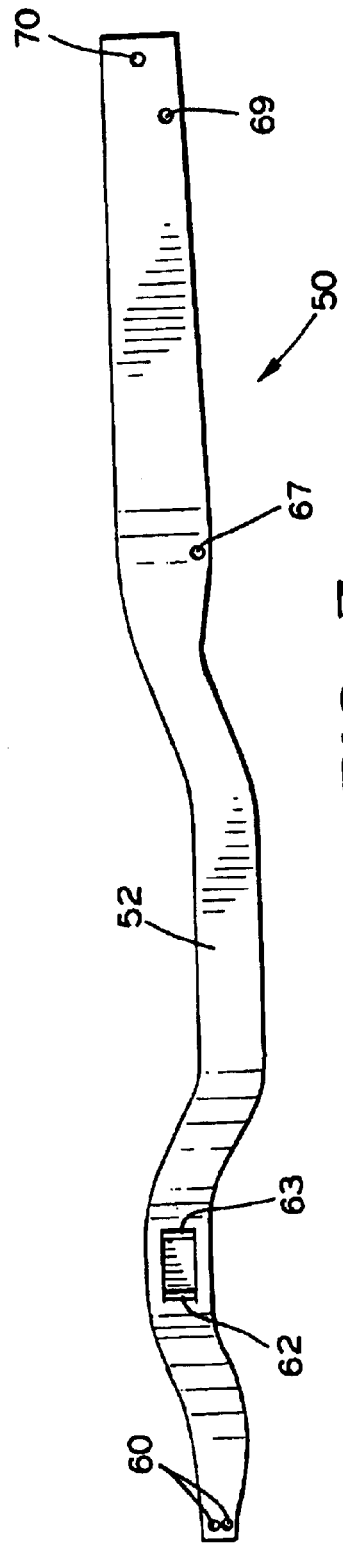
FIG. 7 is a side elevational view of the ladder frame assembly of this invention illustrated in FIGS. 5 and 6.

Referring now to FIGS. 5, 6, and 7, there is illustrated a ladder frame type frame assembly, indicated generally at 50, for a vehicle that has been manufactured in accordance with this invention. The ladder frame assembly 50 includes a pair of longitudinally extending side rails 51 and 52 having a plurality of transverse cross member 53, 54, 55, 56, 57, and 58 extending therebetween. Each of the illustrated side rails 51 and 52 is formed from a single integral closed structural member that extends the entire length of the ladder frame assembly 50. However, it will be appreciated that one or both of the side rails 51 and 52 may be formed from a plurality of individually hydroformed side rail sections that are secured together to form the side rails 51 and 52. The side rails 51 and 52 extend longitudinally throughout the entire length of the assembly 50 and are generally parallel to one another. The cross members 53 through 58 extend generally perpendicular to the side rails 51 and 52 and may be formed having any conventional structure. The cross members 53 through 58 are spaced apart from one another along the length of the ladder frame assembly 50 and can be secured to the side rails 51 and 52 by any conventional means, such as by welding, rivets, and the like. When secured to the side rails 51 and 52, the cross members 53 through 58 provide lateral and torsional rigidity to the ladder frame assembly 50.

Each of the side rails 51 and 52 is manufactured having a plurality of integrally formed mounting structures to facilitate the connection of the various components (not shown) of the vehicle directly to the ladder frame assembly 50, without the use of any of the brackets and mounts 20 through 30 discussed above. As shown in FIGS. 5 through 7, each of the side rails 51 and 52 has a pair of apertures 60 formed therethrough to facilitate the connection of a conventional front bumper assembly (not shown) to the ladder frame assembly 50. The side rails 51 and 52 are shaped such that the apertures 60 are located in exactly the same position relative to the ladder frame assembly 50 as the apertures 20a provided on the front bumper brackets 20 of the prior art ladder frame assembly 10. Thus, the need for such front bumper brackets 20 is obviated in the ladder frame assembly 50 of this invention.

Each of the side rails 51 and 52 also has an aperture 61 formed therethrough to facilitate the connection of a portion of the body (not shown) of the vehicle to the ladder frame assembly 50. The side rails 51 and 52 are shaped such that the apertures 61 are located in exactly the same position relative to the ladder frame assembly 50 as the apertures 21a provided on the front end sheet metal brackets 21 of the prior art ladder frame assembly 10. Thus, the need for such front end sheet metal brackets 21 is obviated in the ladder frame assembly 50 of this invention.

Each of the side rails 51 and 52 has a pair of outwardly extending flanges 62 and 63 formed therein. The flanges 62 and 63 may be formed by forming generally H-shaped cuts in the outer walls of the side rails 51 and 52, then bending the flanges 62 and 63 outwardly therefrom. The flanges 62 and 63 have respective aligned apertures 62a and 63a formed therethrough to facilitate the connection of respective upper control arms (not shown) to the ladder frame assembly 50. The apertures 62a and 63a are located in exactly the same position relative to the ladder frame assembly 50 as the apertures 22a and 23a provided on the upper control arm brackets 22 and 23 of the prior art ladder frame assembly 10. Thus, the need for such upper control arm brackets 22 and 23 is obviated in the ladder frame assembly 50 of this invention.

Each of the side rails 51 and 52 has an inwardly extending protrusion 64 formed thereon. The protrusions 64 are shaped to support an engine (not shown) of the vehicle thereon, and further have apertures 64a formed therethrough to facilitate the connection of the engine to the ladder frame assembly 50. The apertures 64a are located in exactly the same position relative to the ladder frame assembly 50 as the apertures 24a provided on the engine mounts 24 of the prior art ladder frame assembly 10. Thus, the need for such engine mounts 24 is obviated in the ladder frame assembly 50 of this invention.

Each of the side rails 51 and 52 also has apertures 65 and 66 formed therethrough to facilitate the connection of portions of the cab and box (not shown) of the vehicle to the ladder frame assembly 50. The side rails 51 and 52 are shaped such that the apertures 65 and 66 are located in exactly the same position relative to the ladder frame assembly 50 as the apertures 25a and 26a provided on the front cab mount 25 and the front box mount 26 of the prior art ladder frame assembly 10. Thus, the need for such front cab mount 25 and front box mount 26 is obviated in the ladder frame assembly 50 of this invention.

Each of the side rails 51 and 52 further has an aperture 67 formed therethrough to facilitate the connection of a front end of the rear leaf springs (not shown) to the ladder frame assembly 50. The side rails 51 and 52 are shaped such that the apertures 67 are located in exactly the same position relative to the ladder frame assembly 50 as the apertures 27a provided on the rear spring front brackets 27 of the prior art ladder frame assembly 10. As shown in FIG. 6, a slot 67a is formed in the lower surface each of the side rails 51 and 52 to allow the front ends of the rear springs to extend therethrough into the interior of the side rails 51 and 52 in alignment with the apertures 67. Thus, the need for such rear spring front brackets 27 is obviated in the ladder frame assembly 50 of this invention.

Each of the side rails 51 and 52 also has an aperture 68 formed therethrough to facilitate the connection of a portion of the box of the vehicle to the ladder frame assembly 50. The side rails 51 and 52 are shaped such that the apertures 68 are located in exactly the same position relative to the ladder frame assembly 50 as the apertures 68a provided on the intermediate box brackets 28 of the prior art ladder frame assembly 10. Thus, the need for such intermediate box brackets 28 is obviated in the ladder frame assembly 50 of this invention.

Each of the side rails 51 and 52 further has an aperture 69 formed therethrough to facilitate the connection of a rear end of the rear leaf springs (not shown) to the ladder frame assembly 50. The side rails 51 and 52 are shaped such that the apertures 69 are located in exactly the same position relative to the ladder frame assembly 50 as the apertures 29a provided on the rear spring rear brackets 29 of the prior art ladder frame assembly 10. As shown in FIG. 6, a slot 69a is formed in the lower surface each of the side rails 51 and 52 to allow the rear ends of the rear springs to extend therethrough into the interior of the side rails 51 and 52 in alignment with the apertures 69. Thus, the need for such rear spring rear brackets 29 is obviated in the ladder frame assembly 50 of this invention.

Lastly, each of the side rails 51 and 52 has a pair of apertures 70 formed therethrough to facilitate the connection of a conventional rear bumper assembly (not shown) to the ladder frame assembly 50. The side rails 51 and 52 are shaped such that the apertures 70 are located in exactly the same position relative to the ladder frame assembly 50 as the apertures 30a provided on the rear bumper brackets 30 of the prior art ladder frame assembly 10. Thus, the need for such rear bumper brackets 70 is obviated in the ladder frame assembly 50 of this invention.

Figure 8:
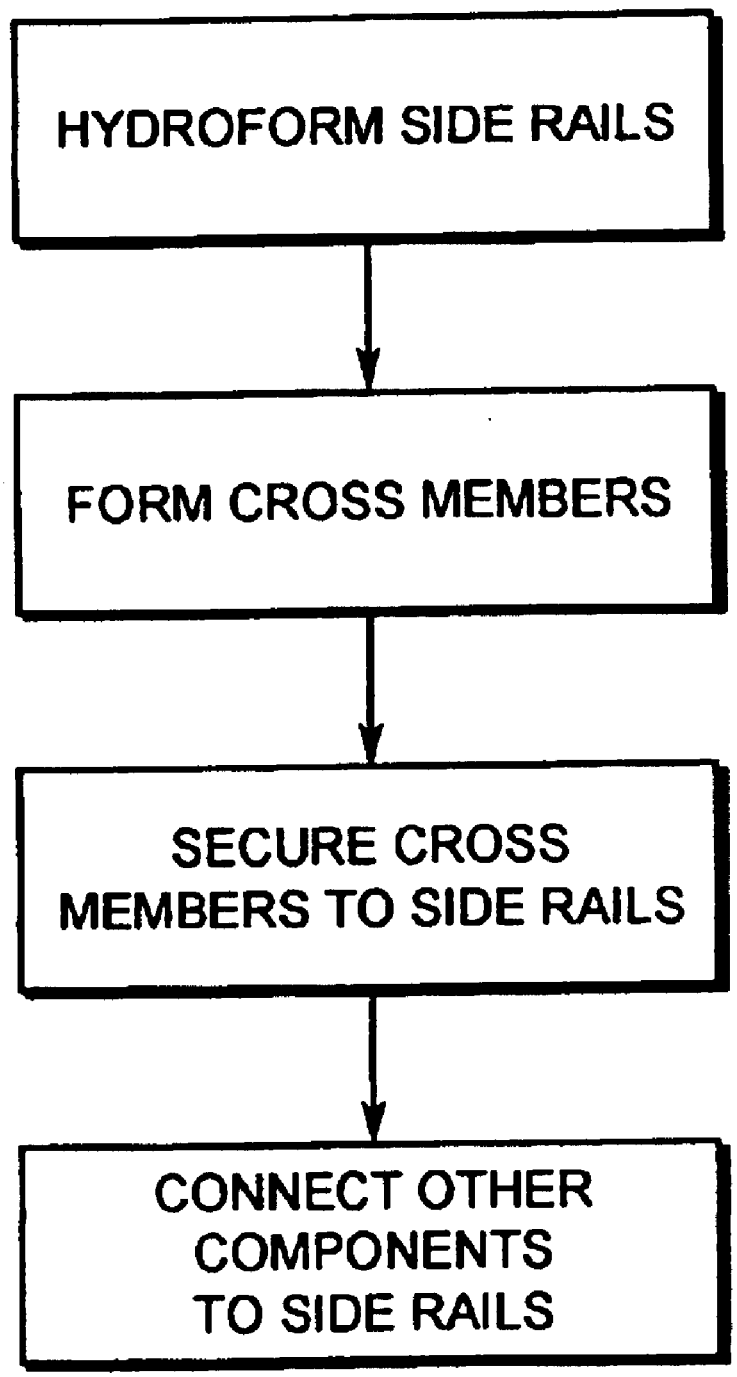
FIG. 8 is a flow chart that illustrates the method for manufacturing the ladder frame assembly of this invention illustrated in FIGS. 5, 6, and 7.

FIG. 8 is a flow chart that illustrates the method for manufacturing the ladder frame assembly 50 of this invention illustrated in FIGS. 5, 6, and 7. Initially, the side rails 51 and 52 are hydroformed to have a desired shape. This desired shape includes forming the side rails 51 and 52 such that the above-discussed apertures and protrusions can be located in exactly the same positions relative to the ladder frame assembly 50 as the corresponding apertures and protrusions provided on the various brackets and mounts of the prior art ladder frame assembly 10. Hydroforming is a particularly well suited process for forming the side rails 51 and 52 because of the complexity of the shapes thereof, and further because the various apertures and protrusions can be formed simultaneously with the formation of the side rails 51 and 52. Any known apparatus may be used to perform the hydroforming process. Then, the cross members 53 through 58 are formed in a manner and secured to the side rails 51 and 52 by any conventional means. Lastly, the other components of the vehicle are connected directly to the side rails 51 and 52 to form the ladder frame assembly 50. It will be appreciated that this direct side rail mounting structure eliminates the need for the various brackets and mounts provided in the prior art ladder frame assembly 10 and, as a result, greatly reduces the time and expense involved in manufacturing the ladder frame assembly 10 of this invention.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a vehicle frame assembly that is adapted to be resiliently supported upon a plurality of vehicle wheels by a suspension system and is adapted to serve as a platform upon which a body portion of the vehicle can be mounted comprising the steps of:

(a) providing first and second side rails that each extend the entire length of the vehicle frame assembly to be manufactured;

(b) hydroforming the first and second side rails so as to have respective integrally formed mounting structures;

(c) providing structures on the first and second side rails to facilitate the connection of a front bumper assembly and a rear bumper assembly thereto;

(d) providing a plurality of cross members;

(e) securing the cross members to the first and second side rails to form a vehicle frame assembly that is adapted to be resiliently supported upon a plurality of vehicle wheels by a suspension system and is adapted to serve as a platform upon which a body portion of the vehicle can be mounted; and (f) connecting a component of the vehicle directly to the integrally formed mounting structures of the first and second side rails without the use of brackets or other mounts.

2. The method defined in claim 1 wherein said step (b) is performed by hydroforming the first and second side rails so as to have respective first and second protrusions.

3. The method defined in claim 2 wherein said step (b) is further performed by orienting the first and second side protrusions to extend respectively from the first and second side rails toward one another.

4. The method defined in claim 1 wherein said step (b) is performed by hydroforming the first and second side rails so as to have respective first and second apertures formed therethrough.

5. The method defined in claim 1 wherein said step (c) is performed by providing structures on the first and second side rails to facilitate the connection of a front bumper assembly, a rear bumper assembly, and a pair of control arms thereto.

6. The method defined in claim 1 wherein said step (c) is performed by providing structures on the first and second side rails to facilitate the connection of a front bumper assembly, a rear bumper assembly, and a pair of leaf springs thereto.

7. The method defined in claim 1 wherein said step (c) is performed by providing structures on the first and second side rails to facilitate the connection of a front bumper assembly, a rear bumper assembly, and a cab thereto.

8. The method defined in claim 1 wherein said step (c) is performed by providing structures on the first and second side rails to facilitate the connection of a front bumper assembly, a rear bumper assembly, and a box thereto.

9. The method defined in claim 1 wherein said step (c) is performed by providing structures on the first and second side rails to facilitate the connection of a front bumper assembly, a rear bumper assembly, a pair of control arms, a pair of leaf springs, a cab, and a box thereto.

* * * * *